Jan. 12, 1943.  I. E. FAIR  2,308,360
LIGHT MODULATING APPARATUS AND METHOD
Filed Nov. 15, 1939  2 Sheets-Sheet 1

INVENTOR
I. E. FAIR
BY
ATTORNEY

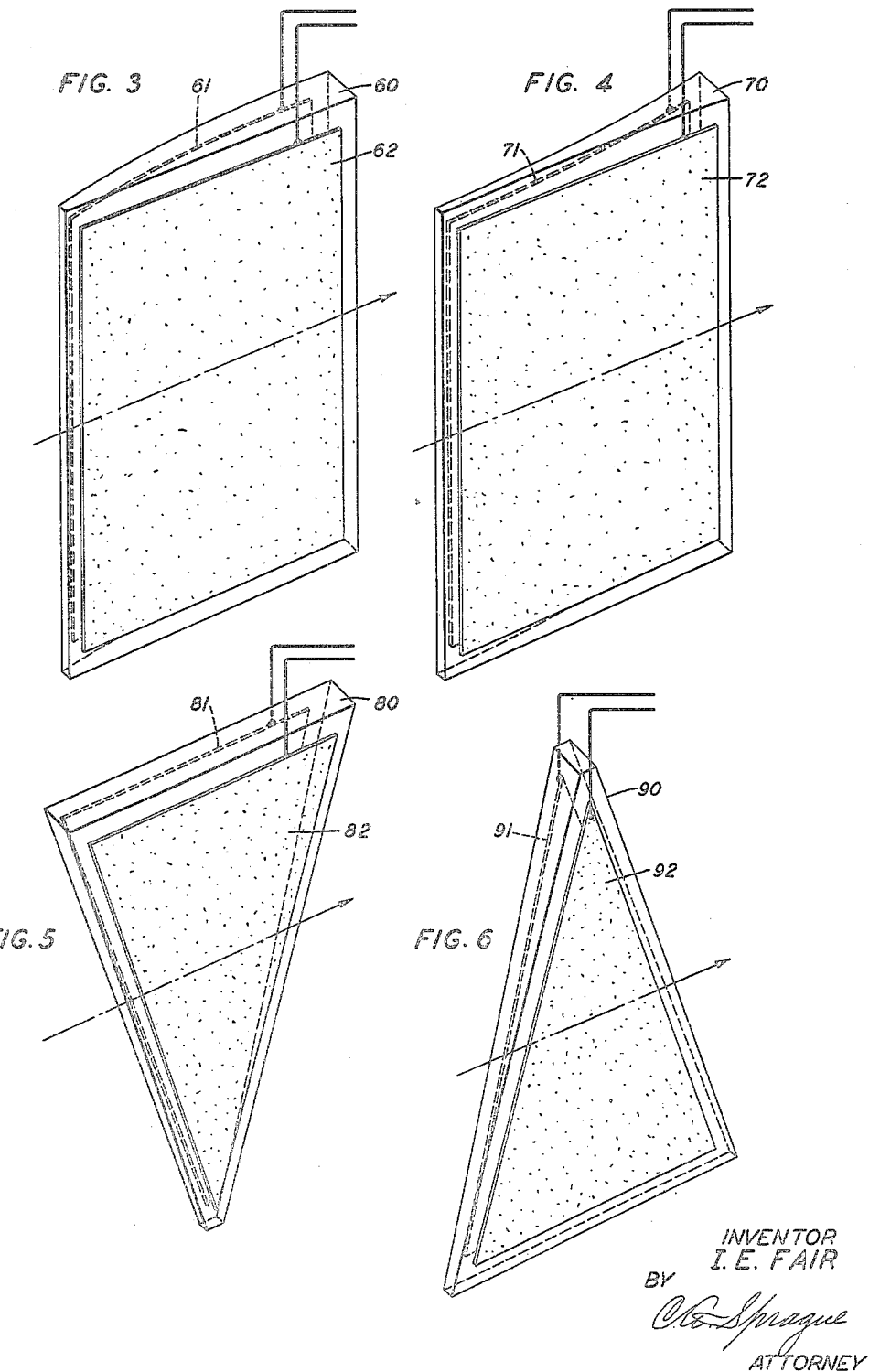

Patented Jan. 12, 1943

2,308,360

UNITED STATES PATENT OFFICE 2,308,360

LIGHT MODULATING APPARATUS AND METHOD

Irvin E. Fair, Lyndhurst, N. J., assignor to Bell Telephone Laboratories, Incorporated, New York, N. Y., a corporation of New York Application November 15, 1939, Serial No. 304,485

18 Claims. (Cl. 88—61)

This invention relates to apparatus for and the method of modulating light and particularly to a light modulating apparatus of the type known as the supersonic light valve.

An object of the invention is to improve the operating characteristics of light valves.

Another object is to control the light transmission of a light valve in accordance with the frequency of a signaling electromotive force.

A supersonic light valve or light modulating cell operates in accordance with the phenomenon discovered by Debye and Sears, which is described by them in the Proceedings of the National Academy of Science, volume 18, pages 409 to 414, June 15, 1932, that compressional waves in a liquid cause diffraction of light. Light passing through the supersonic cell in a direction parallel to the wave fronts of compressional waves propagated through the liquid is transmitted with higher velocity through the regions of rarefaction than through the regions of compression and the velocity of light transmission through these regions is dependent upon the amplitude of the compressional waves. The plane waves in the liquid with the periodic compressions and rarefactions act similarly to a diffraction grating, with its periodic light and dark regions in that the angles of diffraction are the same for equal spacings. An important difference is found, however, in the ratio of diffracted to undiffracted light. Whereas an ordinary diffraction grating allocates a fixed amount of light to each order of diffraction including the zero or undiffracted order, the supersonic wave grating gives an amount of light in the different orders which changes with the amplitude of the waves. When the waves are of zero amplitude all the light falls in the zero or undiffracted order and as the amplitude of the waves is increased, the amount of light in the zero order is decreased and that in the higher orders is increased, the total amount of light transmitted remaining the same.

In a supersonic light modulating apparatus the compressional waves are ordinarily set up in a liquid by a piezoelectric driver element which is set into vibration under control of a voltage from a high frequency source modulated in accordance with signals. Either the undiffracted light is intercepted and only the diffracted light transmitted, or, conversely, the diffracted light is intercepted and only the undiffracted light transmitted. In the description which follows it will be assumed, unless otherwise stated, that the undiffracted light is intercepted and the diffracted light transmitted.

In accordance with the present invention there is provided a supersonic light valve for modulating the intensity of a light beam in accordance with the frequency of an electric wave which is impressed upon the light valve driver.

Preferably the light valve comprises a vessel containing a liquid such as water through which are propagated compressional waves set up by a piezoelectric driver to the electrodes of which a frequency modulated signaling electromotive force is applied. The light to be modulated is transmitted through the liquid in a direction substantially parallel to the wave fronts of the compressional waves and thence focussed upon the bar of a bar light separator screen which intercepts the undiffracted light and transmits the diffracted light. If desired, of course, there may be employed, instead of a bar separator, a slit separator which transmits the undiffracted light and intercepts the diffracted light. As the dimension of the wave front of the compressional wave in the direction perpendicular to the direction of light transmission through the cell and perpendicular to the direction of wave propagation through the cell is increased, the amount of light acted upon by the cell, that is, the amount of light which is diffracted for a given wave amplitude, is increased. Moreover, as the dimension of the wave front in the direction of light propagation is increased, the effectiveness of the light modulation is increased, that is, the amount of light which is diffracted for a given wave amplitude is increased. Thus, if the amplitude of the compressional wave is maintained substantially constant and the area of the wave fronts is caused to vary in accordance with signals, the diffracted (or undiffracted) light transmitted by the valve will also vary in accordance with signals.

The natural frequency of a quartz crystal may be determined from the equation, frequency in kilocycles equals 2860 divided by the thickness in milliammeters. In accordaice with one specific embodiment of the invention herein described for the purpose of illustration, the piezoelectric crystal of a driver for a supersonic light valve varies in thickness along the direction of light propagation through the supersonic cell at a rate such that the rate of change of natural frequency of the crystal with respect to distance in the direction of light transmission varies as a function of the distance from an edge of the crystal, the thickness being substantially uniform for any portion of the crystal along a line perpendicular to the direction of light transmission. The rate of change of thickness with respect to distance from the edge of the crystal is preferably such that the light transmission of the light valve varies directly (or inversely) with the frequency of the electric wave impressed upon the driver electrodes.

In another specific embodiment of the invention herein shown and described, the thickness of the crystal varies along a direction perpendicular to the direction of light transmission through the supersonic cell and the width of the crystal, or of an electrode thereof, or both, in the direction of light transmission also varies. In this embodiment, for example, the rate of change of natural frequency with respect to the distance from an edge of the crystal may be constant, while the width of the crystal, or of an electrode thereof, or both, may vary at such a rate with respect to the distance from an edge of the crystal that the light transmission of the light valve varies directly (or inversely) with the frequency of the electric wave impressed upon the driver electrodes.

In some cases it is desirable to vary the spacing of the electrodes of the piezoelectric driver along the direction in which the thickness of the crystal varies to cause the electric field set up between the electrodes, when a constant amplitude alternating electromotive force is applied to the electrodes, to vary as a function of the distance from an edge of the crystal. For example, if the rate of change of natural frequency with respect to the distance from an edge of the crystal is a constant, the spacing of the electrodes may be made such that the light transmission through the light valve varies as a function of the frequency of the electromotive force applied to the electrodes.

The invention will now be described more in detail with reference to the accompanying drawings in which:

Figs. 3 to 6, inclusive, are perspective views of piezoelectric driver elements which may be used in the supersonic cells shown in Figs. 1 and 2.

Figure 1:
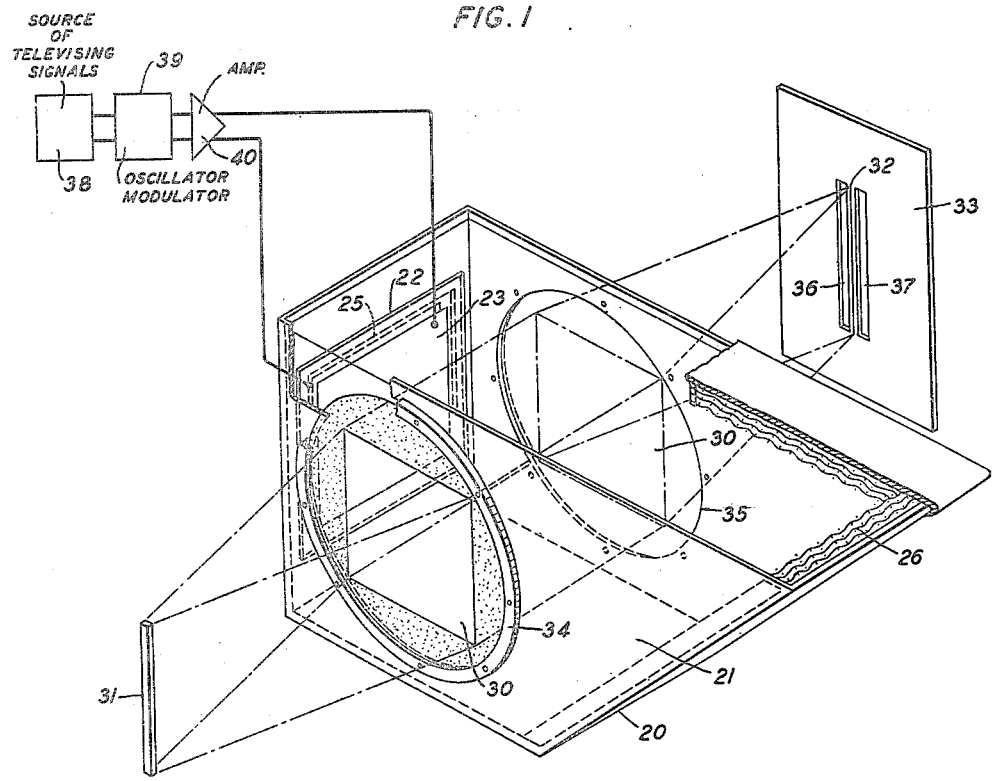
Fig. 1 is a diagrammatic view of a supersonic light valve controlled by a source of television signals in accordance with the present invention.

Referring now to Fig. 1 of the drawings, there is provided a supersonic cell comprising a vessel or a tank 20 filled with water or other suitable transparent elastic substance indicated by the numeral 21. A piezoelectric driver element for setting up compressional waves in the liquid is provided at one end of the tank. The driver element preferably comprises an X-cut quartz crystal 22 cemented with sealing wax or other suitable material to the inner surface of the tank to close an opening provided therein, an inner electrode 23 and an outer electrode 25. In order to attenuate the compressional waves, at the end of their travel through the tank and, therefore, to prevent the reflection of waves which would interfere with the useful waves propagated through the liquid, there are provided several layers of fine mesh wire screen 26.

When used for the production of television images, the usable optical aperture of the cell may be 3 inches by 4 inches, for example, and plate glass windows 30 are cemented to the inner surface of opposite walls of the tank 20 to cover openings of this size. Light from a source indicated at 31, a water cooled mercury arc lamp, for example, is directed through the cell in parallel rays and focussed upon the light intercepting bar 32 of a bar separator screen 33 by means of spherical lenses 34 and 35 secured to the outer surface of the tank 20 over the windows 30. The undiffracted portion of the light beam from source 31 is thus intercepted by the bar 32 while the diffracted portion of the light beam is transmitted through the apertures 36 and 37 whence it may be further directed as desired; for example, it may be directed upon an image producing screen by lenses and mirror drums.

As shown in Fig. 1 television signals from source 38 are supplied to an oscillator-modulator 39 to produce a high frequency current which is modulated with respect to frequency in accordance with television signals. This frequency modulated wave is amplified by the amplifier 40 and then impressed upon the electrodes 23, 25 of the piezoelectric driver of the supersonic light valve.

Figure 2:
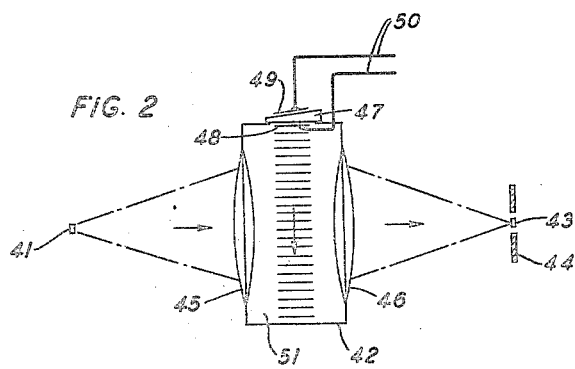
Fig. 2 is a plan view of a supersonic light valve in accordance with the present invention.

As shown in Fig. 2 light from the elongated light source 41, the length of which extends in a direction perpendicular to the plane of the drawing, is directed in parallel rays through the supersonic cell 42 and thence upon the bar 43 of the light separator screen 44 by means of the lenses 45 and 46. At one end of the cell a driver comprising a tapered piezoelectric crystal 47 positioned between electrodes 48 and 49, when energized by a suitable electromotive force applied to leads 50, sets up a compressional wave in the liquid 51 of the cell which travels to the opposite end of the cell where it is absorbed, the compressional waves traveling in a direction substantially perpendicular to the direction of light transmission through the cell, as indicated by the vertical and horizontal arrows, respectively.

Since the crystal varies in thickness along the direction of light transmission through the cell, the natural frequency of the crystal will vary along the dimension in the direction of light transmission and at any instant compressional waves will be radiated from the portion of the crystal which is resonant to the frequency of the applied electromotive force. For the purpose of studying the action involved suppose that the piezoelectric crystal, instead of varying in thickness over a wide range of thicknesses, is made up of only two portions, a thick portion of uniform thickness $T$ and a thin portion of uniform thickness $t$. When an electromotive force of a certain low frequency $F$ is applied to the crystal electrodes, only the portion $T$ having a resonant frequency $F$ will respond and when the frequency of the applied electromotive force is increased to a higher frequency $f$, only the portion $t$ having a resonant frequency $f$ will respond. Assuming now that the dimension in the direction of light transmission of portion $T$ of the crystal, or of an electrode therefor, is larger than that of portion $t$. Then the width of the compressional wave in the direction of light transmission radiated from portion $T$ will be larger than that of the wave radiated from portion $t$. Under these conditions the modulating effect will vary in accordance with the frequency of the applied electromotive force, that is, the amount of diffracted light transmitted by the light valve will be greater when the thick portion of the crystal $T$ is set into vibration in response to an electromotive force of relatively low frequency $F$ than when the thinner portion of the crystal is set into vibration by the application of an electromotive force of higher frequency $f$. Now assume that the portions T and t of the crystal have the same dimension in the direction of light transmission but that the portion T (or an electrode therefor) has a larger dimension in the direction perpendicular to the direction of light transmission and parallel to the wave front of the compressional wave than that of portion t. In this case, more light from source 41 passes through the compressional wave radiated from portion T than that passing through the wave radiated from the portion t.

It is therefore apparent that light may be modulated in a supersonic light valve in accordance with the frequency of a frequency modulated electromotive force applied to the driver thereof by causing the dimension in the direction of light transmission or in a direction perpendicular to the direction of light transmission (both parallel to the wave front of the compressional wave), or both, of the wave front of the compressional wave radiated from the piezoelectric driver to vary in accordance with the frequency of the electromotive force. For this purpose the opposed electrodes may be so spaced that the intensity of the electric field set up between the electrodes is the same at all portions of the crystal at any instant. If desired, however, the spacing of the electrodes may also be varied. For example, the dimension of the wave fronts of the compressional waves radiated from portions T and t respectively may be the same and the amplitude of the compressional wave from portion T be made less than that of the wave radiated from portion t by employing a wider spacing for the electrodes at T than the spacing of the electrodes at portion t, the amplitude of the alternating electromotive force being constant. In this case the amount of light transmission through the light valve will be relatively small when a wave is radiated from portion T. Moreover, the radiating area of portions of the piezoelectric crystal having different natural frequencies, respectively, may be varied in addition to varying the spacing of the electrodes at the different portions, respectively, of the crystal.

Any of the piezoelectric driver elements shown in Figs. 3 to 6, inclusive, may be used in the supersonic light valves shown in Figs. 1 and 2. In each of these figures the direction of light transmission through the supersonic cell is indicated by an arrow.

The driver of Fig. 3 comprises a piezoelectric crystal 60 and a pair of opposed electrodes 61, 62 to which a frequency modulated electromotive force may be applied. The crystal 60 is so shaped that the width of the vibrational area in the direction of light transmission is a function of frequency. The thickness of the crystal is uniform along any given line drawn perpendicular to the direction of light transmission. However, the thickness of the crystal increases along the direction of light transmission going from the left-hand edge to the right-hand edge of the crystal as viewed in the drawing, the rate of change of thickness with respect to distance in the direction of light transmission decreases in going from the left-hand edge to the right-hand edge. At low frequencies, therefore, the width of the portion of the crystal which is set into vibration is larger than that which is set into vibration at relatively high frequencies and, if the electric field which causes the crystal to vibrate is the same at all frequencies, the light transmission of the light valve will increase as the frequency decreases, the rate of change of light transmission with respect to frequency being dependent upon the rate of change of thickness of the crystal with respect to distance along its width. As previously stated, of course, this light transmission-frequency characteristic can be modified as desired by varying the spacing of the electrodes, for example, by plating the electrodes directly upon the opposed faces of the crystal. Alternatively the crystal may be ground to give approximately a desired light transmission-frequency response characteristic, the inner electrode 62 plated upon the one face of the crystal and the other electrode 61 made adjustable so that its spacing with respect to the fixed electrode 62 may be varied at different portions of the crystal, respectively, until the desired response characteristic is accurately obtained.

The driver shown in Fig. 4 comprising a piezoelectric crystal 70 positioned between opposed electrodes 71 and 72 is like the driver of Fig. 3 except that the rate of change of thickness with respect to distance along the width of the crystal increases as the thickness increases. Therefore, as the frequency of the applied electromotive force increases, the width of the portion of the crystal which is set into vibration will likewise increase.

In Fig. 5 there is shown a driver for a supersonic light valve comprising a piezoelectric crystal 80 and opposed electrodes 81, 82. The thickness of the crystal varies along an axis perpendicular to the direction of light transmission through the supersonic cell. In this case the rate of change of natural frequency with respect to distance in a direction perpendicular to the direction of light transmission may be constant, for example. The width of the crystal or of one of the electrodes therefor also varies. Specifically, as viewed in the figure, the top portion of the crystal has the maximum thickness and width while the bottom portion has the minimum thickness and width. In operation, therefore, the upper portion of the crystal will vibrate at low frequencies to set up a compressional wave which is relatively wide in the direction of light transmission while the lower portion of the crystal will vibrate at higher frequencies to set up a relatively narrow wave in the liquid of the supersonic cell. Therefore, in a supersonic cell having a driver of the type shown in Fig. 5 the light transmission will increase as the driving frequency is decreased. As in the embodiments of the invention described in connection with Figs. 3 and 4, the spacing of the electrodes 81 and 82 may be such that the electric field for setting the crystal into vibration is the same at all portions of the crystal at any instant or, if desired, the spacing of the electrodes may be varied so that at any instant the field at one portion of the crystal will be greater or less than that at another portion of the crystal having a different natural frequency.

The embodiment of the invention shown in Fig. 6 comprising a piezoelectric crystal 90 and opposed electrodes 91 and 92 is like that shown in Fig. 5 except that the width of the crystal and its electrodes increases as the thickness of the crystal along an axis perpendicular to the direction of light transmission decreases. Therefore, for a uniform field at all portions of the crystal, the light transmission of the light valve will increase as the frequency of vibration increases.

In Figs. 5 and 6, if desired, the piezoelectric crystal and one of the electrodes therefor may be of uniform width and the remaining electrode may vary in width. The operation of the light valve when thus modified will not be changed since the crystal plate radiates waves into the liquid of the supersonic cell only over a region covered by electrodes on both sides of the crystal with sharp cut-off at the electrode boundaries.

It is apparent that a large number of compressional wave cycles may be present in the supersonic cell at any instant and that different cycles or groups of cycles may have different wave-lengths, respectively. Therefore, different portions of the cell along the direction of wave propagation through the cell may simultaneously control the transmission of different portions of a light beam incident upon the cell, respectively, each portion controlling the transmission of an amount of light which varies in accordance with the frequency or wave-length of the compressional wave at that portion.

It is obvious that, if desired, the driver elements of Figs. 3 to 6, inclusive, may be so positioned in the supersonic cell that the light transmission through the cell is in a direction at right angles to that indicated by the arrows. In the embodiments of Figs. 3 and 4, the dimension in the direction of light transmission of the wave fronts of the compressional waves will be constant and that in the direction perpendicular to the direction of light transmission will vary in accordance with frequency. This may also be true with respect to Figs. 5 and 6. In those figures, however, the thickness of the crystal may vary at such a rate that the dimension of the wave fronts of the compressional wave varies in the direction of light transmission and also in the direction perpendicular thereto in accordance with frequency.

What is claimed is:

1. A supersonic light valve comprising a liquid, mechanical vibratory means capable of responding at frequencies over a frequency range representing a large frequency variation for setting up supersonic waves in said liquid, and means for directing light through said liquid in a direction substantially parallel to the wave fronts of said waves, said mechanical vibratory means having a surface in contact with said liquid, different portions of which surface are set into vibration at different frequencies respectively, said portions having different dimensions in a given direction respectively.

2. The method of modulating a light beam which comprises producing waves in a liquid, directing light through said liquid in a direction parallel to the wave fronts of said waves, and causing a dimension of said waves in a direction parallel to said wave fronts to vary in accordance with the wave-length of said waves.

3. A light valve comprising a fluid and piezoelectric crystal vibratory means for setting up in said fluid in response to the vibration of said crystal waves, a dimension of which in a direction parallel to the wave fronts varies as the frequency of the waves set up in said fluid changes, said vibratory means having a surface in contact with said liquid different portions of which surface are set into vibration at different frequencies respectively, said portions having different dimensions in a given direction, respectively.

4. A supersonic light valve comprising a liquid and means comprising a piezoelectric crystal positioned between electrodes for setting up waves in said liquid, the rate of change of thickness of said crystal with respect to distance along a dimension of said crystal being a function of said distance.

5. A supersonic light valve comprising a liquid and means comprising a piezoelectric crystal positioned between electrodes for setting up waves in said liquid, both the thickness and width of said crystal varying with respect to distance measured along an axis of said crystal.

6. A supersonic light valve comprising a liquid and means comprising a piezoelectric crystal positioned between electrodes for setting up waves in said liquid, both the thickness of said crystal and the width of one of said electrodes varying with respect to distance measured along an axis of said crystal.

7. In combination, a light valve comprising a liquid, a vibratory element having a surface in contact with said liquid, the thickness of said element at different portions thereof being such that areas of different size of said surface are set into vibration at different frequencies, respectively, means for directing a light beam through the liquid of said valve and means for impressing upon said light valve a carrier electromotive force of substantially constant peak amplitude modulated with respect to frequency in accordance with signals to cause said vibratory element to vibrate at the frequency of said carrier electromotive force and to cause the amount of light transmitted by said valve to vary in accordance with said frequency variations.

8. In combination, a source of frequency modulated electromotive force, a source of light and a supersonic light valve for modulating the light from said source comprising a liquid, means for directing light from said source through said liquid and means controlled by said frequency modulated electromotive force for setting up compressional waves in said liquid for causing the intensity of the light emitted by said light valve to vary in accordance with the frequency variations of said electromotive force.

9. A supersonic light valve comprising a transparent elastic substance through which plane compressional waves may be propagated and means for setting up in said substance compressional waves the dimension of the wave fronts of which in the direction of light propagation through said light valve varies in accordance with the wave frequency.

10. A supersonic light valve comprising a transparent elastic substance through which plane compressional waves may be propagated and means for setting up in said substance compressional waves the area of which in a plane parallel to the direction of light transmission through said light valve varies in accordance with the frequency of the wave.

11. The method of modulating a light beam which comprises propagating compressional waves through a transparent medium under control of a frequency modulated signaling electromotive force, transmitting the light beam through said medium in a direction substantially parallel to the wave fronts of said waves and causing the area of the wave fronts of said waves to vary in accordance with the wave-length thereof to vary the intensity of the light beam in accordance with the frequency of said signaling electromotive force.

12. The method of modulating a light beam in accordance with signals which comprises setting up in a transparent medium compressional waves having wave fronts the area of which varies in accordance with signals, directing the light beam through said medium in a direction substantially parallel to the wave fronts to cause diffraction of said light beam in accordance with said area and separating the diffracted and the undiffracted portions of said light beam.

13. A driver for a supersonic light valve comprising a piezoelectric crystal having a plurality of radiating portions of different thickness and therefore of different natural frequency, respectively, and opposed electrodes for said crystal, a dimension of said portions other than thickness varying in accordance with the natural frequency thereof.

14. A driver for a supersonic light valve comprising a piezoelectric crystal having a plurality of radiating portions of different thickness and therefore of different natural frequency, respectively, and opposed electrodes for said crystal, a dimension of said portions other than thickness and the spacing of said electrodes at said portions respectively varying in accordance with the natural frequency of said portions.

15. A supersonic light valve comprising a piezoelectric crystal and opposed electrodes therefor for setting up compressional waves in a substance through which light is transmitted, the thickness of said crystal being different in different planes, respectively, which planes are parallel to each other and to the direction of light transmission through said substance and which intersect said crystal and the electrodes therefor, the width of one of said electrodes as measured along the lines formed by the intersections of said planes with said electrodes being different at different intersecting lines, respectively.

16. The combination with a vibratable crystal element having electrodes adapted to be energized by an alternating electromotive force, said element being so shaped that it resonates in different portions thereof in response to applied electromotive forces of different frequency, respectively, and that the extent of vibrating surface area varies with frequency, of means for applying an electromotive force of changing frequency to said electrodes whereby surface areas of said crystal element of correspondingly different extent are set into vibration in succession to set up compressional waves in the medium in contact with said surface, and means including an additional energy source for utilizing said compressional waves to cause energy from said source to be dependent upon the extent of the vibrating area of said surface.

17. A combination in accordance with claim 16 in which said electromotive force of changing frequency is a continuously alternating wave modulated in accordance with a signal.

18. A combination in accordance with claim 16 in which said electromotive force of changing frequency is a continuously alternating wave of constant amplitude modulated with respect to frequency in accordance with a signal.

IRVIN E. FAIR.